Sept. 8, 1959

J. J. WALLACE 2,902,722

COTTON PRECLEANING APPARATUS FOR REMOVING
STICKS, GREEN LEAVES, AND LIKE TRASH

Filed Aug. 1, 1957

INVENTOR
*Jeffrey J. Wallace*

BY Mason, Fenwick & Lawrence
ATTORNEYS

Sept. 8, 1959  J. J. WALLACE  2,902,722
COTTON PRECLEANING APPARATUS FOR REMOVING
STICKS, GREEN LEAVES, AND LIKE TRASH
Filed Aug. 1, 1957  2 Sheets-Sheet 2

INVENTOR
Jeffrey J. Wallace

BY Mason, Fenwick & Lawrence
ATTORNEYS

United States Patent Office 2,902,722
Patented Sept. 8, 1959

2,902,722

COTTON PRECLEANING APPARATUS FOR REMOVING STICKS, GREEN LEAVES, AND LIKE TRASH

Jeffrey J. Wallace, Amite, La., assignor to Gullett Gin Company, Amite, La., a corporation of Louisiana Application August 1, 1957, Serial No. 675,592

4 Claims. (Cl. 19—67)

This invention relates to cotton precleaning apparatus especially designed to remove sticks, green leaves and other like contaminating substances which in particular characterize mechanically harvested cotton.

One of the objects of the invention is to provide apparatus of the class described, in which the cleaned cotton is at all times propelled and directed away from the trash, dirt, sticks and limbs removed from the same, and away from the incoming stream of dirty cotton.

Another object of the invention is to provide precleaning apparatus, including a plurality of saw cylinders about which the cotton successively passes, operating at such speed as to sling off sticks, green leaves, trash or dirt between series of suitably spaced grid rods.

A further object of the invention is the provision in apparatus such as is above described of reclaiming means for handling the sticks and other trash, discharging through the grids admixed with the small amount of cotton incidentally detached from the saw cylinder, and a collecting saw cylinder, receiving the main stream of cotton from the stick removing saw cylinders, together with the lesser stream of reclaimed cotton from the reclaiming means, uniting said streams and presenting the united stream to a doffer.

Still another object of the invention is the provision of a stripper roll, for the collecting cylinder having vanes that engage the cotton on said collecting roll, at a point subsequent to the point at which the two streams of cotton are united, for knocking off residual debris from the cotton, and the provision of serially related reclaiming means, which successively handle the material discharging through the grids, and to both of which the debris from the main cotton stream is distributively delivered by said stripper roll.

Other objects of the invention will appear as the following description of a practical embodiment thereof proceeds.

In the drawing which accompanies and forms a part of the following specification:

Figure 1 is a side sectional view, in a vertical plane, of apparatus embodying the principles of the invention;

Figure 2 is a fragmentary perspective view of one of the fixed grids associated with the rapidly rotating saw cylinders;

Figure 4:
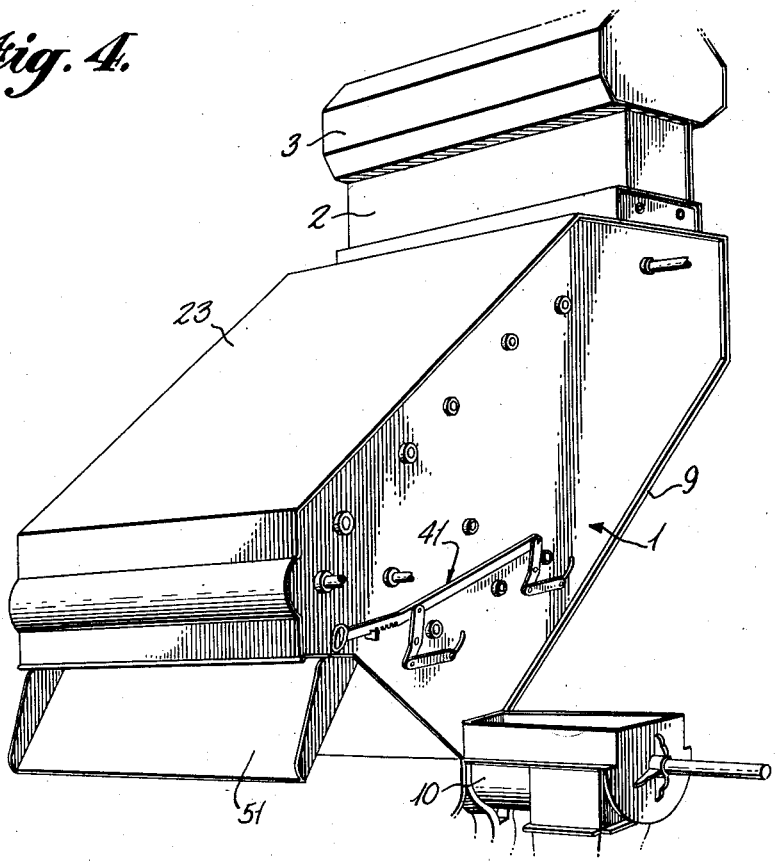
Figure 4 is a perspective view illustrating the adjusting means for the reclaimer cylinder grids.
Figure 3:
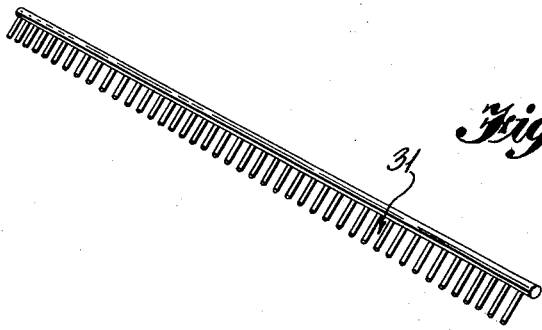
Figure 3 is a fragmentary perspective view of one of the spring finger boards associated with the reclaimer cylinders.

Referring now in detail to the drawing, the numeral 1 represents one side of the casing, both sides being, in general, alike and parallel, in which the shafts of the various rotating instrumentalities are journaled. The casing has an inlet opening at the top, which is shown connected to a duct 2 leading from a distributing conduit 3, which houses the cooperating screw conveyors 4 that bring the seed cotton to the precleaning apparatus. A pair of feed rolls 5 are mounted in the mouth of the inlet opening, and supply cotton to the underlying directing and cleaning drum 6.

Said drum is furnished with a perforated screen 7 arranged concentrically of said drum and extending about its periphery through an arc that embraces the leading side and under side of the drum. Said drum is conventional, in that it has parallel projecting cross bars 8 forming pockets in between, which become filled with cotton that is pushed around by the cross bars. The peripheral speed of the drum 6 is fast enough to press the cotton centrifugally against the screen 7, with the result that loose small trash and dirt is sifted through the screen. The casing below said screen is formed with a downwardly convergent planiform end wall 9, which terminates adjacent the conveyor trough 10 furnished with a screw conveyor 11. Trash passing through the screen into the trash passage 25 lodges upon the inclined wall 9, gravitates down into the conveyor 11, which discharges it at a point outside the casing. No cotton is lost through the screen 7 because of the fineness of the perforations.

The drum 6 discharges the cotton over the partition 12 onto the first of a pair of main cleaning instrumentalities comprising the saw cylinders 13 and 14. Each of these is provided with a grid 15 and 16, respectively, consisting of side flanges fixed to the opposite side walls of the casing, and a series of transverse parallel grid rods 17 and 18, arranged in concentric arcs about the leading and under sides of said cylinders and spaced far enough therefrom so that they are not contiguous to the cotton seated in the teeth of the cylinders. Each of these cylinders is driven at a sufficiently fast peripheral speed to sling off the sticks, green leaves, trash and dirt against and through the grid rods. A small amount of cotton, which may be free-riding upon the cotton seated in teeth of the saw cylinders may be thrown off with the debris. A baffle 33 defines with the end wall 9 of the casing, the trash passage 25, from which the cotton discharged through the grids is excluded.

Brush-type doffers 21 and 22, at the rear of the respective grids remove the cotton from the respective saw cylinders. The doffer 21 transfers the cotton to the cylinder 14, and since the act of doffing causes considerable intermixing of the cotton in the space between the saw cylinders, this results in bringing sticks, leaves, etc., which were not eliminated by the first cylinder to the surface of the cotton on the second cylinder, in optimum position to be removed by the second cylinder. The sticks and stems in the cotton coming in at the feed rolls, lie of course, in desultory arrangement. The pushing action of the cross bars 8 on the directing drum, and the brushes of the doffer 21, tend to arrange the sticks which are obliquely encountered by said bars and brushes, parallel to the grid rods, so that when slung off they will pass between the grid rods and not become lodged crosswise against them.

The saw cylinders 13 and 14 are positioned one below the other, so that gravity assists in delivering the cotton doffed from cylinder 13 to cylinder 14. Said cylinders are in a cotton passage defined between the downwardly sloping end wall 23 of the casing, the grids 15 and 16, and the baffle 24 which bridges the space between the grids. This passage is at the side of the casing remote from the trash passage and isolates the main cotton stream passing therethrough from the intermediate mixed cotton and trash chamber 26 underlying the grids 15 and 16, which conduct trash and a modicum of cotton escaping through the grids, to reclaiming and separating means located at the base of said chamber and serially related.

These comprise the reclaimer sets 27 and 28, each including a toothed reclaimer cylinder, respectively 29 and 30 and a corresponding finger-board, with rows of spring fingers respectively 31 and 32 cooperating therewith. The material sifting through both grids consisting of sticks, green leaves, other large and small trash and cotton gravitates downward through the chamber 26, being funneled upon the reclaimer set 27 by the partitions 33 and 34. The trash that lands in contact with the cotton is on the surface thereof and not embedded, and is therefore readily removed. The fingers are spaced wide enough to let the sticks pass between them endwise. The saw travels toward the fingers in close proximity thereto, the cotton becoming seated in the teeth and being pulled through the fingers without becoming detached. The trash, including sticks that will not fall between the fingers, collects behind them, being pressed against them by the rotating cotton, causing the fingers to yield and spill the trash into the trash passage 25. Small trash which rides on the cotton past the fingers 31 is knocked off by the bars 35 of the grid 36, which may be adjusted radially to bring the bars into contact with the cotton. A doffer removes the cotton from the reclaimer saw 29, transferring it to the reclaimer set 28, which is similar to the set 27 in the construction and functioning of the saw 30 and fingers 32. The doffer is underlain by a guard 38, which prevents the cotton on the doffer from being exposed to the fly trash in the atmosphere of the trash passage below said guard, the latter extending from the grid of the first reclaimer set to the finger-board of the second set. The reclaimer cylinder 30 is provided with a grid 39, the bars 40 of which contact the cotton carried by the cylinder 30. This grid also is radially adjustable, both grids being adjusted simultaneously from outside the casing, through the linkage 41.

By virtue of the serial arrangement of the reclaimer sets 27 and 28, the cotton reclaimed from both saw cylinders 13 and 14 is doubly cleaned, not only sticks, green leaves and boll fragments, such as particularly characterize mechanically harvested cotton, but also the smaller debris that contaminates all seed cotton regardless of how it is picked.

However, the reclaimer sets, in the present invention are additionally employed in imparting a cleaning stage to the main cotton stream coming off of the saw cylinders 13 and 14. This brings into the picture the collecting saw cylinder 42, to which the main cotton stream is transferred from the saw cylinder 14 by the doffer 22, and which rotates in the direction opposite to that of the saw cylinder 14, and faster than the adjacent reclaimer cylinder 30. This saw cylinder has a plurality of functions, which will now appear.

Not all of the sticks and other trash are removed centrifugally by cylinders 13 and 14 and discharged through the respective grids. Residual trash is transferred with the cotton to the cylinder 42. A stripper roll 43 is, therefore, provided adjacent the point at which the main cotton stream lands upon the collecting cylinder 42. The stripper roll rotates in a contra direction to the cylinder 42, and has vanes 44 which engage the cotton seated on the cylinder 42, and knocks off hulls, hull particles, sticks, together with any cotton that may be loose on this saw cylinder. Some of these particles are light, and may be thrown quite a distance; others are heavy, and descend sooner. A partition 45 is provided which as a matter of expedient extends downward from the lower end of the grid 16 to a point close to a horizontal plane passing through the axis of the cylinder 42 and substantially in a vertical plane spaced from the cylinder 42 to form therebetween a passage 49 discharging into the reclaimer set 28. The partition 45 is interrupted intermediately forming an opening 46, which is in the trajectory path of the heavier particles, which pass through this opening. On the opposite side of the partition 45, and adjacent the opening is the spiked directing roll 47 which directs the particles over the upper end of a chute 48 which conducts them to the reclaimer set 27. The lighter particles having less inertia, fall close to the cylinder 42 and through the passage 49, landing on the reclaimer set 28. Particles both large and small that strike the partition 45, fall through the passage 49. The purpose of the opening 46 is to provide distribution of the cotton knocked off from the main cotton stream, to both reclaimer sets, so that the reclaimer set 28 will not be overloaded.

The cotton from the main stream mingles, at the reclaimer sets with the cotton from the grids 15 and 16. That which is delivered to the reclaimer set 27 is passed to the reclaimer set 28. All of the reclaimed cotton is removed from the reclaimer saw 30 by the faster moving cylinder 42 and joined to the main cotton stream in advance of the stripper roll. The ratio of reclaimed cotton to the cotton in the main stream is small, and the main stream overlies the reclaimed cotton on the cylinder 42, so that the stripper roll acts primarily upon the cotton of the main stream. However, if an occasional stick or twig of leaves persists until it reaches the cylinder 42 with the reclaimed cotton, it may protrude sufficiently through the overlying cotton of the main stream, to be contacted by the stripper vanes and by them knocked out of the cotton mass. Beyond the stripper roll the main stream cotton and the reclaimed cotton on the cylinder 42 have become a substantially homogeneous mass, which is removed by the doffer 50 and let drop gravitationally into the chute 51. The debris from all the separating instrumentalities finally gravitates down the convergent walls 9 and 52 of the casing into a screw conveyor which conducts it to a suitable discharge point outside the casing.

The cotton precleaning apparatus as above described may be situated over a gin stand, as a feeder, and can also be used singly or in series as a separate unit, or units to preclean cotton and remove sticks, green leaf and other trash from the cotton prior to its entering other precleaning equipment or between various stages of cleaning in the ginning operation.

While I have in the above description disclosed a practical embodiment of the invention, it will be understood by those skilled in the art that the specific details of construction and arrangement of parts, as shown and described, are by way of example and not to be regarded as necessarily limiting the scope of the invention.

What I claim is:

1. Cotton precleaning apparatus adapted for the removal of sticks comprising a series of cylinders arranged to establish a downward flow of cotton fed to said apparatus, including an anterior directing drum having means for arranging sticks transversely of the direction of cotton flow, an intermediate cleaning cylinder to which cotton with arranged sticks is fed by said directing cylinder, a grid about the lower portion of said cleaning cylinder having bars spaced to pass the thickest expectable sticks and incidentally some cotton thrown off by said cleaning cylinder, and a collecting cylinder at the posterior end of said series, a doffer positioned to transfer cotton from said cleaning cylinder to said collecting cylinder and a doffer to remove cleaned cotton from said collecting cylinder, a reclaimer cylinder arranged below said cleaning cylinder positioned to receive the trash and cotton discharged through said grid, a stripper roll positioned between said aforementioned doffers to forcibly strip trash with adherent sticks and cotton from said collecting cylinder, at such point on said cylinder as to establish a substantially transverse trajectory path for the stripped matter, in the general direction of said reclaimed cylinder, a baffle extending in an up-and-down direction between said stripper roll and said reclaimer cylinder forming an obstruction for the lighter thrown particles and having an opening therethrough in trajectory path of the heavier particles to permit their through passage to said reclaimer cylinder, a second reclaimer cylinder positioned in the gravitational path of descent of those particles that strike said baffle, and in operative relation to said collecting cylinder to transfer cleaned cotton thereto, reclaimer grids operatively positioned with respect to said reclaimer cylinders having closely spaced bars to substantially exclude passage of lint cotton therebetween, finger boards related to the respective reclaimer cylinders having fingers yieldable to discharge sticks carried on the face of the cotton on said reclaimer cylinders, and a doffer positioned to transfer cotton from the first mentioned reclaimer cylinder to the second mentioned reclaimer cylinder.

2. Cotton precleaning apparatus as claimed in claim 1, said reclaimer grids being adjustable radially of said reclaimer cylinders.

3. Cotton precleaning apparatus as claimed in claim 1, including a chute between said opening and said first mentioned reclaimer cylinder directed toward the latter, and a directing roll between said opening and chute for impelling particles entering said opening toward said chute.

4. Apparatus as claimed in claim 1, a casing enclosing the structure therein specified, and partitions in said casing extending in the general direction of the cotton flow defining with said casing a trash passage beneath said directing cylinder, into which the trash and sticks from said directing cylinder and reclaimer cylinders is discharged, a chamber for said cleaning cylinder, and an intermediate chamber with which the grid of said cleaning cylinder communicates, the first mentioned reclaimer cylinder being at the lower end of said intermediate chamber.

References Cited in the file of this patent
UNITED STATES PATENTS

| | | |
|---|---|---|
| 1,680,978 | Garner | Aug. 14, 1928 |
| 2,121,722 | Wright | June 21, 1938 |
| 2,739,353 | Mitchell et al. | Mar. 27, 1956 |